United States Patent
Beyda

(10) Patent No.: US 7,130,409 B2
(45) Date of Patent: Oct. 31, 2006

(54) SYSTEMS AND METHODS USING SECONDARY SIGNAL BACKCHANNELING

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 679 days.

(21) Appl. No.: 10/310,468

(22) Filed: Dec. 5, 2002

(65) Prior Publication Data

US 2004/0109552 A1    Jun. 10, 2004

(51) Int. Cl.
*H04M 7/00*    (2006.01)
*H04L 12/66*    (2006.01)
*G06F 15/16*    (2006.01)

(52) U.S. Cl. ............... 379/229; 370/352; 709/200; 709/227

(58) Field of Classification Search ............ 379/229; 709/227, 200; 600/300; 370/352
See application file for complete search history.

(56) References Cited

U.S. PATENT DOCUMENTS

| | | | |
|---|---|---|---|
| 6,301,352 B1 | 10/2001 | Chung et al. | |
| 6,446,127 B1 * | 9/2002 | Schuster et al. | 709/227 |
| 6,466,573 B1 | 10/2002 | Renucci | |
| 6,577,622 B1 * | 6/2003 | Schuster et al. | 370/352 |
| 6,584,490 B1 * | 6/2003 | Schuster et al. | 709/200 |
| 6,659,947 B1 * | 12/2003 | Carter et al. | 600/300 |

* cited by examiner

*Primary Examiner*—Wing Chan
*Assistant Examiner*—Thjuan P. Knowlin

(57) ABSTRACT

Within a network environment, redundant capabilities for exchanging call-processing signals enhance reliability of telephony support for telephony endpoint devices. A data network, such as a telephony-over-local area network, provides primary support for the telephony endpoint devices, which may be telephony-enabled computers or Internet Protocol telephones. A second network has a first mode in which it is inactive with respect to telephony traffic to the telephony endpoint devices, but has a second mode in which call-processing signals are routed through the second network in response to a determination that the data network is disabled. As a result, telephone features such as call deflection may be continued when the primary support is disabled. In some implementations, the second network includes a third mode in which the voice information is also carried as a response to determining that the data network is disabled and the currently available bandwidth of the second network exceeds a threshold bandwidth level.

21 Claims, 4 Drawing Sheets

SYSTEMS AND METHODS USING SECONDARY SIGNAL BACKCHANNELING

BACKGROUND OF THE INVENTION

The invention relates generally to systems and methods for supporting telephony for an enterprise and relates more particularly to reducing the susceptibility of telephony systems to data network failures.

There are a variety of alternative approaches to supporting call sessions for telephones of an enterprise, such as a corporation. A traditional approach is to use a private branch exchange (PBX) to provide all of the call processing for telephony devices. The call processing by the PBX includes supporting call-related features, such as call forwarding and voice messaging, in addition to the required routing of incoming and outgoing calls.

Another known approach is to integrate the call processing with a data network, such as a local area network (LAN) of an enterprise. The separate components that are used to form a particular telephony-over-LAN (ToL) system will vary from implementation to implementation. Common components include gatekeepers, gateways, legacy PBXs, Internet Protocol (IP) phones and endpoints, and messaging servers.

An example of a ToL system is shown in FIG. 1. The ToL system includes a number of endpoints 10, 12 and 14, with each endpoint including a personal computer 16 and a telephone 18. The personal computers are configured to run ToL software. Thus, each computer may be equipped with a telephony application programming interface (TAPI) that allows the computer to have telephone capability. The telephones 18 may be digital phones. While the system of FIG. 1 includes linked computers and telephones, the device endpoints of a ToL system may alternatively be standalone IP phones, and/or the computers may be equipped with microphones and speakers that enable the computers to function as telephones.

The endpoints 10 transfer non time-critical data (such as electronic mail) and time-critical data (such as voice information) to each other using communication resources 20 of the data network 22, which is represented as a bus. The communication resources may include routers, switches and other conventional components. The computers 16 and telephones 18 are network endpoints that have unique addresses. For example, each of the computers may have a unique IP address that is used to uniquely identify the computer as the target endpoint for particular data and voice transfers.

In the example of FIG. 1, the data network 22 is a LAN. The system includes a gateway 24 and a gatekeeper 26. The gatekeeper maintains a database of the unique addresses for the endpoints of the network. Upon receiving a request for a data or voice transfer from an external telephony device to one of the network endpoints, such as the telephony-enabled personal computer 16 of the first workstation 10, the gatekeeper translates an endpoint alias (such as a host name or e-mail address) or translates a telephone address (such as an address in a telephone number format) to identify the network endpoint. The various functions of gatekeepers are known in the art.

The gateway is used to provide protocol conversions, when necessary. The gateway may translate call-processing signals and voice information from a packet-switched format used within the data network 22 to a circuit-switched format that is used by some external networks 28, such as the public switched telephone network (PSTN). The protocol conversion enables endpoints of the network 22 to communicate with external telephony devices, such as telephones, workstations of other enterprises, or workstations of the same enterprise (corporation) having facilities in more than one city. If the data network 22 is only connected to another data network, such as when networks are interconnected to form a wide area network (WAN), the gateway 24 may not be necessary, since protocol conversion may not be required.

The system of FIG. 1 also includes an off-network messaging system 30. The workstations 10, 12 and 14 may be configured to allow a user to automatically transfer incoming calls to the messaging system when the user is going to be unavailable or when the user wishes to remain undisturbed. Messages that are recorded by the system 30 may be retrieved by the appropriate users at a later time.

The utilization of a data network 22 to support telephony capability for various endpoints 10, 12 and 14 has a number of advantages. System upgrades are easily implemented. Often, the upgrade only requires the installation of software at the computers, with the software being downloaded and installed at the user's convenience. Moreover, sophisticated telephony features can be provided inexpensively, since the processing power of the computer may be employed.

Avoiding communication isolation is an important concern for corporations, whether the corporation employs separate data and telephony systems or integrates telephony and data communications support. U.S. Pat. No. 6,301,352 to Chung et al. describes a method and system that addresses the concern as applied to a network of computers that are not used for providing telephone conversations, but are linked to the PSTN in order to receive data from other computers or computer networks. Thus, there is a path from the PSTN to the LAN of computers. If the path to the LAN is disrupted, the computers will be able to interact with each other, but will be isolated from the PSTN. The Chung et al. patent specifically addresses the problem in which the path from a common channel signaling gateway to the LAN is disrupted. The Chung et al. system provides a second path to the LAN. The alternative signaling paths provide improved fault tolerance for connecting LANs to external networks.

SUMMARY OF THE INVENTION

According to a specific embodiment, the present invention provides a system for supporting telephony. The system includes a plurality of client telephony devices for initiating and receiving calls, and a telephony-over-local area network (ToL) enabled to support communications involving the client telephony devices with respect to both voice data and call-processing signals, thereby providing a first signal-handling capability of exchanging the call-processing signals for voice calls directed for connection to the client telephony devices via said ToL. The system also includes a second network enabled to provide a second signal-handling capability of exchanging the call-processing signals for said voice calls directed for connection to the client telephony devices via the ToL. The first and second signal-handling capabilities are redundant capabilities for exchanging the call-processing signals with individual the client telephony devices.

According to another specific embodiment, the present invention provides a communications system for an enterprise. The system includes a plurality of telephony endpoint devices, first enterprise telephony resources enabled to support the telephony endpoint devices for communications with a central communications network that is external to the enterprise, and second enterprise telephony resources having a backup mode in which call-processing signaling between the central communications network and the telephony endpoint devices is transmitted via the second enterprise telephony resources. The second enterprise telephony resources are components of an enterprise LAN. The system also includes a detector configured to activate the backup mode when the support of the telephony endpoint devices by the first enterprise telephony resources is disabled.

According to another specific embodiment, the present invention provides a method of supporting communication with a plurality of telephony endpoint devices. The method includes steps of utilizing a data network as a primary network for exchanging voice data and call-processing signals with the telephony endpoint devices, detecting occurrences in which the data network is disabled with respect to exchanging the call-processing signals with the telephony endpoint devices, and activating a secondary signal-handling capability upon detecting the occurrences. The secondary signal-handling capability is available via a second network that is linked to the telephony endpoint devices. The activating step including enabling the second network to transmit and receive the call-processing signals to and from the telephony endpoint devices.

These and other embodiments and the advantages and features of the present invention are further described below in conjunction with the following drawings.

DETAILED DESCRIPTION OF SPECIFIC EMBODIMENTS

The invention uses two networks that can separately access client telephony devices in order to provide redundant capabilities for exchanging call-processing signals with the client telephony devices. One network is a data network that supports telephony, such as a telephony-over-local area network (ToL) that is intended to provide the primary network for exchanging both voice data and the call-processing signals. The second network has a first mode in which it is inactive with respect to telephony traffic that was originally intended to be carried via the data network, but includes a second mode in which the call-processing signals of such traffic are routed through the second network in response to a determination that the data network is disabled. In some embodiments, the second network includes a third mode in which the voice data for such traffic is also carried, in response to a determination that the data network is disabled and the currently available bandwidth of the second network exceeds a threshold bandwidth level.

The data network may be dedicated to a particular enterprise, such as the ToL of a corporation. The client telephony devices may be telephones, telephony-enabled computers, or workstations in which each workstation includes both a computer and a telephone. The devices are typically user-dedicated and are endpoints of the network (i.e., telephony endpoint devices). Each client telephony device is configured to communicate directly with the second network when the data network is disabled.

In the corporate environment, the components of the data network may be considered to be first enterprise telephony resources, while the second network may be comprised of second enterprise telephony resources. Thus, the second network may be a wireless LAN that is used to support portable client telephony devices of the corporation, such as those carried to conference rooms. However, other second networks are considered, such as wired and wireless power line networks, infrared networks, and free-space optical networks.

An even more disruptive barrier, from a business viewpoint, is one in which the LAN itself fails, particularly if the LAN is used to support telephony. Without a properly operating LAN, the client telephony devices (whether telephony-enabled computers, telephones, or computer/telephone combinations) will be isolated, and outside parties will be unaware of the isolation. What is needed is a system and method in which telephony continues to be at least partially supported even when the supporting data network is disabled.

By enabling the exchange of call-processing signals even when the data network is disabled, the features of the client telephony devices may be activated. For example, the client telephony devices may exchange signaling that forwards incoming calls to a messaging system, such as a voice message server.

Figure 1:
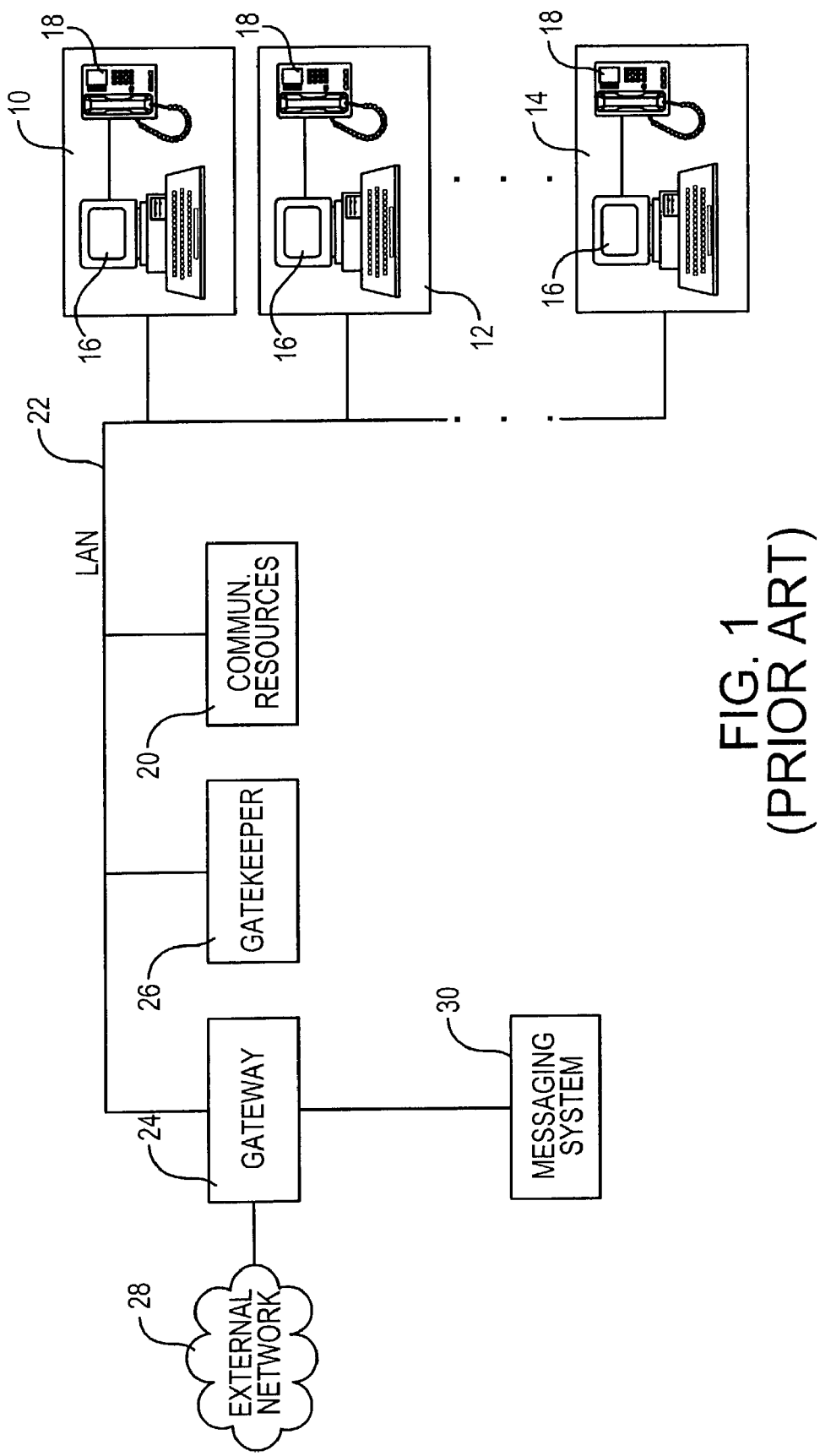
FIG. 1 is a schematic view of a telephony-over-LAN in accordance with the prior art.
Figure 2:
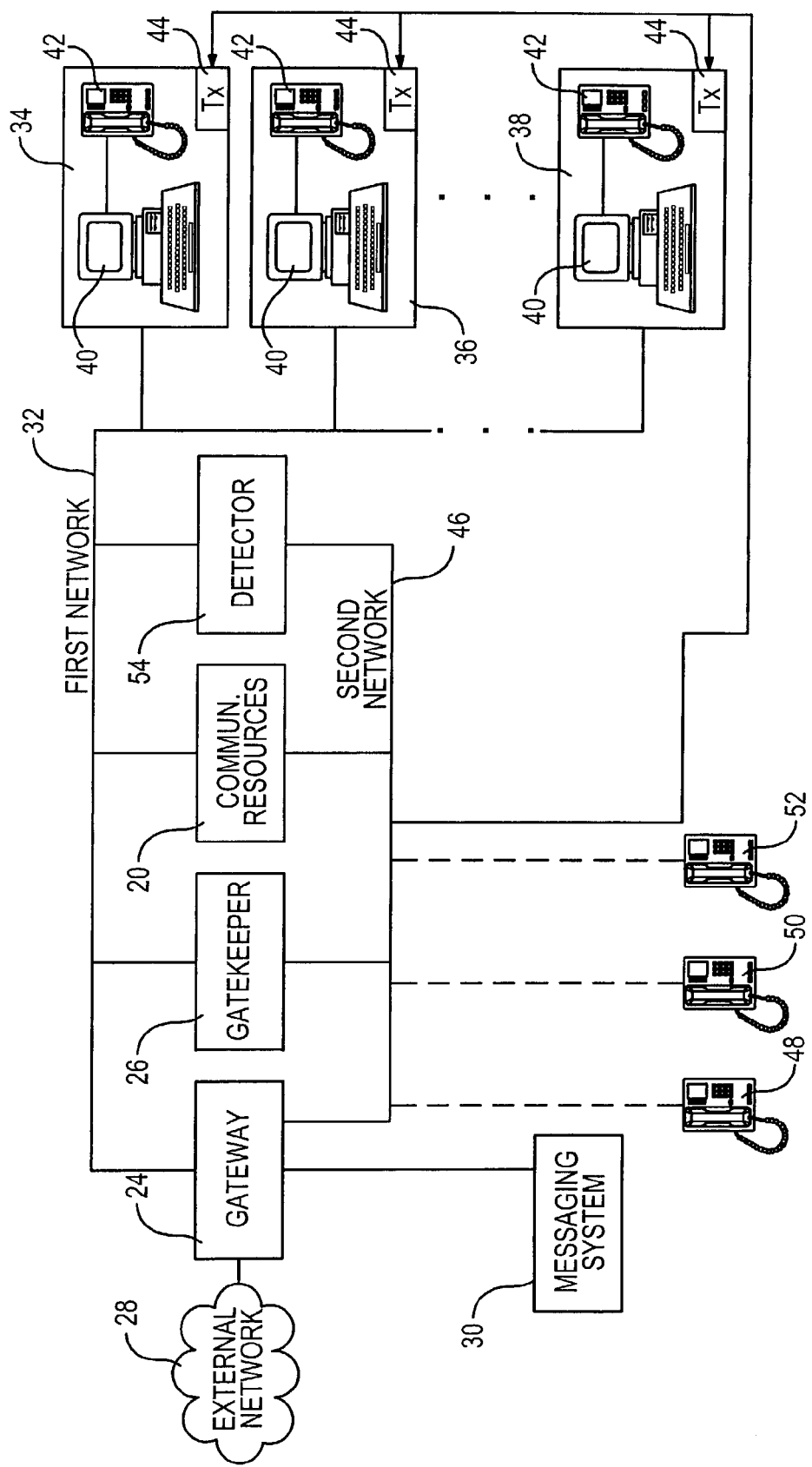
FIG. 2 is a schematic view of a telephony-over-LAN with a secondary signaling backchannel provided by a second network in accordance with a first embodiment of the invention.

FIG. 2 represents one possible implementation of the invention that provides a secondary signaling backchannel. The system of FIG. 2 includes a first LAN 32 having conventional components, so that the same reference numerals are used for the communication resources 20, the gateway 24, and the gatekeeper 26 of the exemplary prior art system of FIG. 1. The first LAN 32 supports data transmissions involving workstations 34, 36 and 38, whether the transmissions are between two of the workstations or between a workstation and an external device connected to the first LAN via an external network 28. The external network may be the PSTN or the global communications network referred to as the Internet. As another possibility, the external network may be another data network that combines with the components of FIG. 2 to form a wide area network (WAN).

The first LAN 32 is designed to support telephony. Thus, in addition to enabling data communications, telephone communications involving the workstations 34, 36 and 38 are enabled. In FIG. 2, each workstation includes a computer 40 and a telephone 42, such as an Internet Protocol (IP) telephone. As described with reference to FIG. 1, the workstations may be limited to a telephony-enabled computer or limited to the IP telephone. As another alternative, each workstation may include both the computer and the telephone, but with the two IP telephony endpoint devices being stand-alone devices, rather than being linked as shown in FIG. 2. As defined herein, telephony endpoint devices are devices that are the targets of incoming calls, with the calls being answered by individuals using the telephony endpoint devices.

Each workstation 34, 36 and 38 is also shown as including a transceiver 44. The transceiver is illustrated as a separate component, but may be a combination of hardware and software built into one or both of the computer 40 and the telephone 42. The transceivers allow the workstations to communicate with a second network 46. Thus, in the embodiment shown in FIG. 2, the second network provides an alternative path from the gateway 24 to the individual workstations.

In the application in which the workstations 34, 36 and 38 are on-premises client devices of a single enterprise, the components dedicated to the first LAN 32 are first enterprise telephony resources, while the components dedicated to the second network 46 may be second enterprise telephony resources. Within many enterprises, the first LAN is implemented as a ToL with wired connections to the workstations 34, 36 and 38. In a practical implementation of FIG. 2, the second network 46 may be a wireless LAN. Wireless LANs are deployed to support telephony connections involving a limited number of client devices. For example, the second network may be used to enable wireless communications with portable telephones 48, 50 and 52. Such portable telephones may be carried from conference room to conference room to allow continuous access to the users to which the telephones are assigned.

While perhaps the most practical implementation of the invention is the one in which the second network 46 is a wireless LAN, other embodiments are contemplated. The important feature of the invention is that the two networks 32 and 46 provide redundant capabilities for exchanging call-processing signals with individual workstations 34, 36 and 38. Wired networks and other types of wireless networks may be used as a substitute for the wireless LAN to achieve the redundant capability for exchanging call-processing signals. Examples include power-line networks, infrared networks, and free-space optical networks. Moreover, it is not critical that the two capabilities for exchanging the call-processing signals utilize the same protocol. The second network may be an Ethernet LAN, but may alternatively use the Bluetooth technology or may use the 802.11b protocol.

In FIG. 2, the connections between the second network 46 and the portable telephones 48, 50 and 52 are shown as dashed connections in order to represent wireless transmissions. While the connections to the transceivers 44 of the workstations 34, 36 and 38 are shown as being solid lines, the transmissions are also likely to be wireless transmissions.

Under normal operating conditions, the first LAN 32 supports all call sessions involving one of the computers 40 or telephones 42. However, occurrences arise in which the first LAN is disabled. In FIG. 2, the first LAN is shown as including a detector 54 for identifying such occurrences. The type of detector is not critical to the invention. As one possibility, the detector may periodically "ping" the various components of the system. If the components are not reachable, the detector may use the second network 46 to cause the components to switch to the backup mode in which the second network 46 is used for exchanging call-processing signals, such as call setup. That is, the backup mode of the second network may be triggered by notifying the communication resources 20, the gateway 24, the gatekeeper 26, and the workstations 34, 36 and 38 that the call signal-handling capability of the second network is to be used. In this backup mode, the detector may continue to monitor the first network 32 for the purpose of detecting when the first network returns to a fully functional condition.

As another possible implementation of the detector 54, the illustrated detector represents software in each one of the relevant endpoints of the network, including the workstations 34, 36 and 38, the communications resources 20, the gateway 24 and the gatekeeper 26. Then, when a signal is transmitted during normal operations of a device having the watchdog software, an absence of an appropriate response may be interpreted by the device as an indication of the unavailability of the first network. With the first network being unavailable, the device is automatically switched to the transmission of the same signal via the second network 46. In this embodiment, the clients are switched on a device-by-device basis from the first network to the second network. Alternatively, the first device to identify the unavailability of the first network may notify the other devices, such as the gateway 24 and the gatekeeper 26, that the second network is to be used until the availability of the first network is restored. In its first mode, the second network does not enter into operations intended to be performed by the first LAN 32. The backup mode activates the second signal-handling capability provided by the second network. In this mode, at least the call-processing signals of incoming calls are conducted from the gateway 24 through the second network to the individual workstations. Thus, in addition to its intended operations, the second network functions as a secondary signaling backchannel. As is well known in the art, there are a number of different call-processing signals. Such signals include call setup. For some technologies, such as ISDN, the call-processing signals are carried along a separate channel from the voice data. For other technologies, the voice data and call-processing signals are carried along the same channel, but are easily separated.

In some applications, the second network 46 will include a third mode. The second network is likely to have a limited bandwidth that does not enable the network to continuously support call sessions intended for transmissions via the first LAN 32. Restricting the second network to enabling the exchange of call-processing signals typically will not provide any bandwidth problems. For example, the second network may merely exchange signals with the first workstation 34, for example, so as to cause an incoming call to be deflected to the messaging system 30 that is not dependent upon proper operations of the first LAN 32. Consequently, if a user is aware that the first LAN is disabled, the user may configure the first workstation to deflect the calls to the messaging system. In the third mode of the second network 46, the network is identified as having a current available bandwidth that exceeds a threshold. Thus, if the second network is relatively idle, it will have sufficient bandwidth to allow support of a limited number of call sessions. When the threshold condition is satisfied, the third mode is triggered and at least a limited number of call sessions to the individual workstations will be supported.

An advantage of the invention is that it allows a business to preserve basic call-handling capability during times in which the first LAN 32 is experiencing problems. For example, the basic call messaging feature of a ToL system, or other rerouting feature, is preserved by using the second network 46. Ideally, the second network exists for other reasons, such as for supporting the portable telephones 48, 50 and 52, so that implementing the invention merely requires an upgrade to the second network so as to provide the call-handling capabilities for the workstations 34, 36 and 38.

Figure 3:
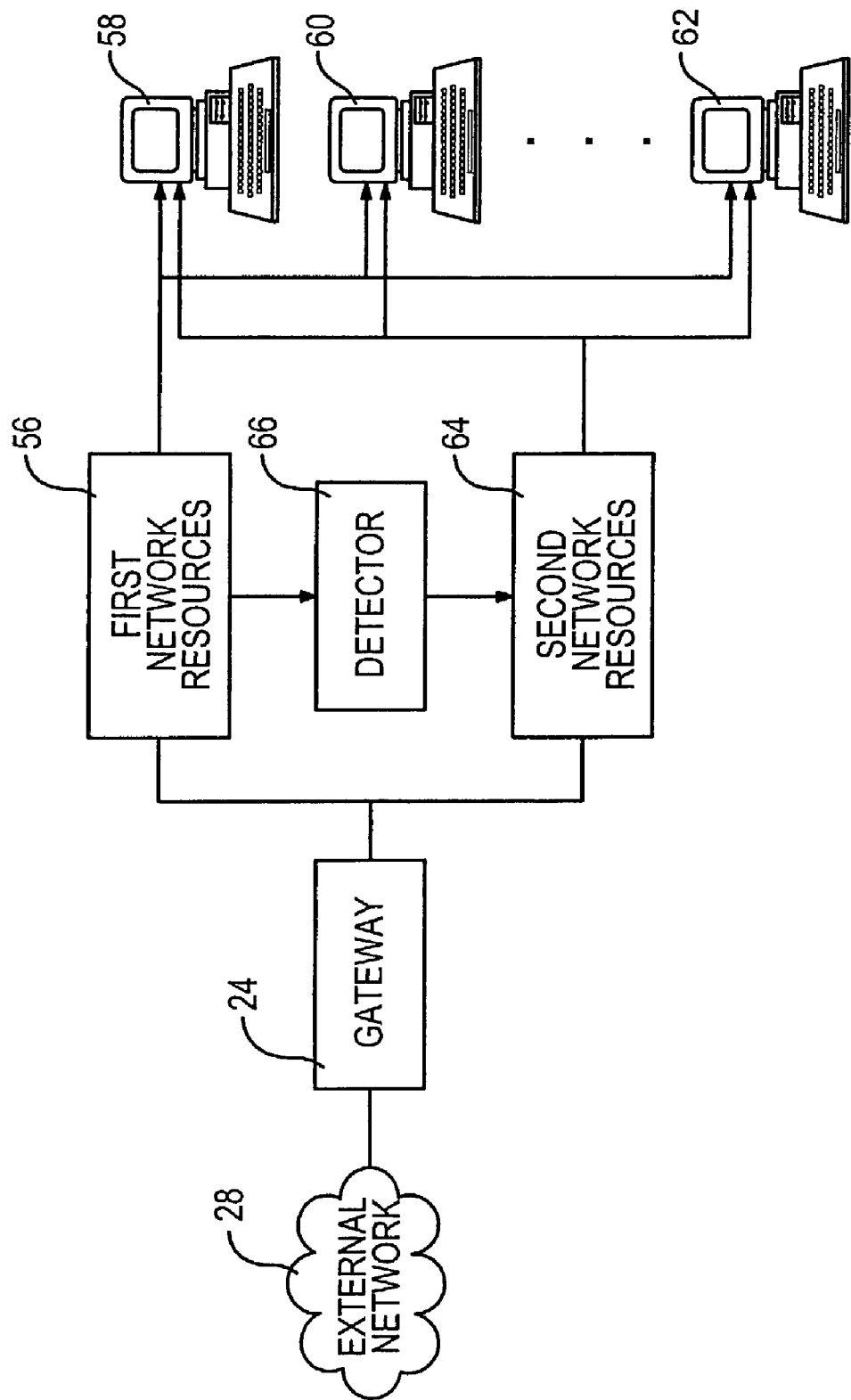
FIG. 3 is a schematic view of a second embodiment of the invention.

FIG. 3 shows a second embodiment of the invention. In this embodiment, the enterprise, such as a corporation, includes two pre-existing networks. First network resources 56 may be primarily dedicated to transferring call-related information (voice and signaling) to telephony-enabled computers 58, 60 and 62. On the other hand, the resources 64 of the second network may be primarily dedicated to transferring data. The resources of each network include the components that allow the network to be operated separately from the other network. For example, both sets of network resources 56 and 64 include routers and switches.

A detector 66 is used to identify conditions that indicate that telephony is unsupported by the first network resources 56. The detector transmits a control signal to the second network resources 64 to activate a secondary capability for exchanging call-processing signals. Thus, if the first network is disabled, the second network will at least preserve the basic call-handling features, such as call forwarding and call deflection to a messaging system, not shown.

As a modification to FIG. 3, the first network resources 56 may be connected to IP telephones and the second network resources 64 may be connected to the computers 58, 60 and 62, which are not necessarily telephony enabled. In this application, the two networks operate independently with independent sets of client devices. The relationship of mutual independence is changed when the telephony support by the first network is disrupted. If the resources 64 of the second network have sufficient bandwidth to support the call sessions in combination with the data exchange sessions, the second network may be used to provide both capabilities while the first network is disabled. However, if the bandwidth of the second network is too limited to support both capabilities on a continuous basis, supporting voice communication by the second network may be limited to those times in which its current available bandwidth exceeds a predetermined bandwidth threshold.

Figure 4:
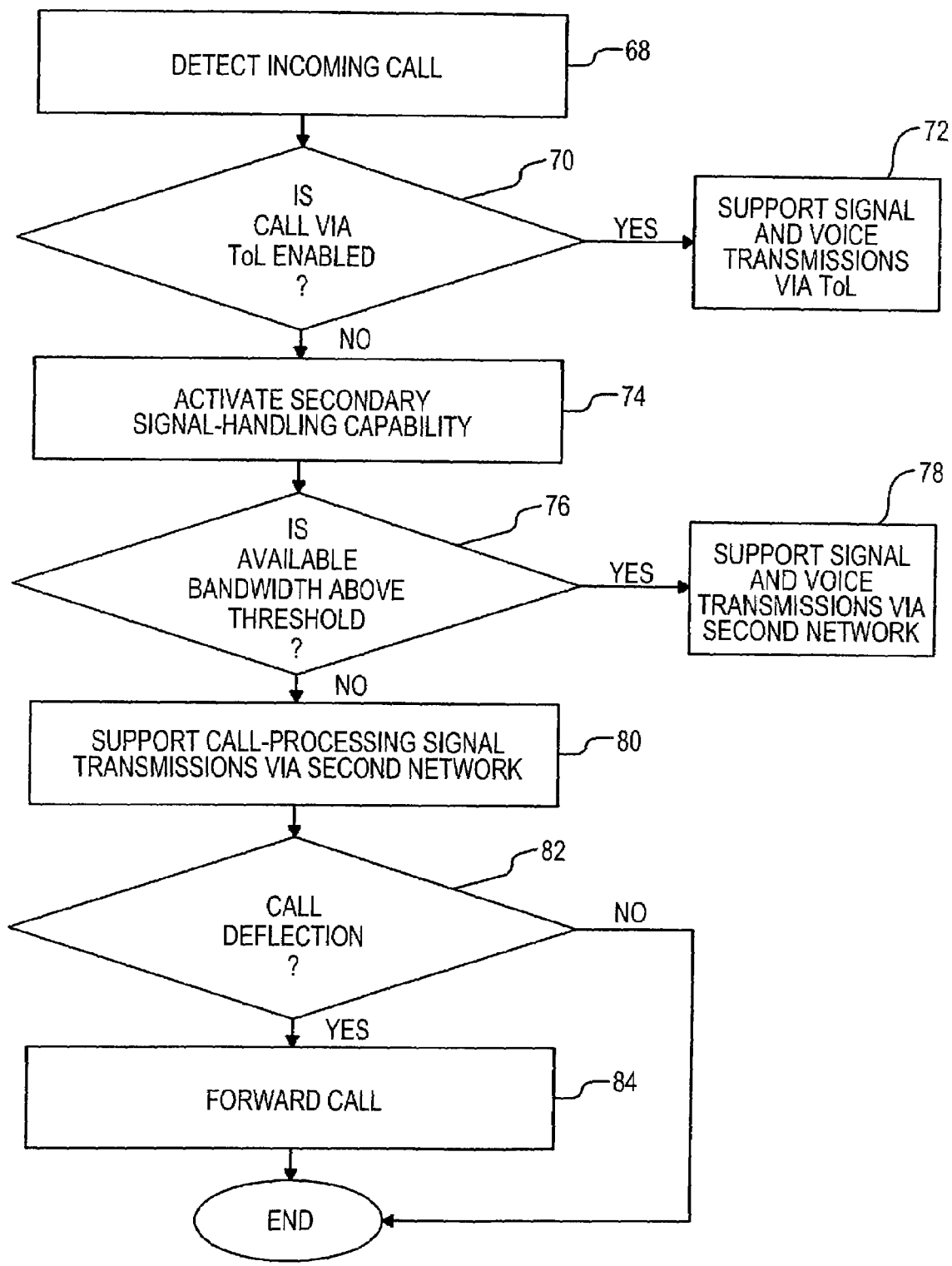
FIG. 4 is a process flow of steps for operating the networks of FIGS. 2 and 3.

FIG. 4 illustrates the process flow of steps for one implementation of the invention. At step 68, an incoming call is detected. In FIG. 2, the incoming call may be from the external network 28, such as the PSTN. The incoming is detected by the gateway 24, which provides any necessary protocol conversion. The techniques for call detection are not significant to the invention.

At step 70, the determination is made as to whether the ToL or other type of "first network" is enabled. Under normal operating conditions, an affirmative response is obtained. Consequently, normal processing is executed. In step 72, the affirmative response results in the ToL supporting both the signal transmissions and the voice transmissions. By signal transmissions, what is meant herein is the call-handling signals that are typically transparent to the user of a telephone, but are required for proper operation of the telephone and its enhanced features.

For occurrences in which the ToL or other telephony network is identified as being disabled, the secondary signal-handling capability is activated at step 74. The secondary signal-handling capability provides a backchannel for transmitting call-processing signals to and receiving call-processing signals from the individual client telephony devices, such as IP telephones.

Decision step 76 is optional. Where the second network has sufficient bandwidth to support both signal and voice transmissions, the process bypasses the decision and progresses to the step 78 of supporting the signal and voice transmissions via the second network. The advantage of the decision step 76 is in those applications in which the second network has a limited bandwidth and the enterprise wishes to maximize the utilization of the bandwidth. A threshold bandwidth level is selected and a determination is made as to whether the currently available bandwidth exceeds the threshold. If an affirmative response is returned, step 78 is executed. On the other hand, if the currently available bandwidth is insufficient to reliably support the incoming call, only the call-processing signals are transmitted via the second network, as indicated at step 80.

One possible call-processing signal that is transmitted during step 80 may be referred to as a call deflection signal, which forwards the incoming call to a messaging system that is not dependent upon the disabled ToL. At decision step 82, the process determines whether calls are being deflected by the target telephony device. If a negative response is received, the process will end. On the other hand, if the calls are being deflected to a messaging system, the incoming call is forwarded at step 84. Call deflection may alternatively be a call forwarding process to a second telephone that is fully functional. As previously noted, an advantage of the process is that enhancement features of the client telephony devices can be accessed even when the primary network is disabled.

One advantage of the invention is that call deflections can continue to occur at the different client devices, such as the workstations 34, 36 and 38 of FIG. 2. Call deflections from the gateway 24 to the messaging system 30 may be universally provided by the gateway 24 when the first network 32 is disabled, but universal call deflection limits the options available to the individual users of the workstations. At times, a user of a telephony endpoint device will define complex deflection rules. For example, the user of the workstation 34 may deflect calls to a cellular telephone or pager during one block of time, a conference room during the subsequent block of time, and another workstation during a third block of time. Instead of relying upon the gateway 24 to provide a default deflection to the messaging system 30, the redundant capabilities for exchanging call-processing signals allow the complex deflection rules that were selected by the individual users to be enforced at the target devices.

What is claimed is:

1. A system for supporting telephony comprising:
   a plurality of client telephony devices for initiating and receiving calls;
   a telephony-over-local area network (ToL) enabled to support communications involving said client telephony devices with respect to both voice data and call-processing signals, thereby providing a first signal-handling capability of exchanging said call-processing signals for voice calls directed for connection to said client telephony devices via said ToL; and
   a second network enabled to provide a second signal-handling capability of exchanging said call-processing signals for said voice calls directed for connection to said client telephony devices via said ToL, said first and second signal-handling capabilities being redundant capabilities for exchanging said call-processing signals with individual said client telephony devices;
   wherein said second network is configured to limit activation of said second signal-handling capability to occasions in which said ToL is disabled with respect to supporting said communications involving said client telephony devices.

2. The system of claim 1 wherein said second network is a wireless LAN for supporting mobile telephony devices and wherein said client telephony devices include user-dedicated telephones.

3. The system of claim 1 wherein said second network has a bandwidth capacity that is insufficient for continuously supporting said voice calls directed for connection to said client telephony devices via said ToL, said second network being linked to said client telephony devices to enable selected non-voice features of said client telephony devices as a backup to enabling said selected non-voice features via said ToL.

4. The system of claim 3 further comprising a controller configured to monitor available bandwidth of said second network and to activate said second network to support said voice calls to said client telephony devices when said available bandwidth exceeds a threshold bandwidth level, such that exchanges of both said voice data and said call-processing signals are supported by said second network when said available bandwidth exceeds said threshold bandwidth level.

5. The system of claim 4 further comprising a messaging system configured to store messages intended for access by users of said client telephony devices, said selected non-voice features including a call forwarding feature in which calls to particular said client telephony devices are call forwarded to said messaging system as a consequence of said second signal-handling capability.

6. The system of claim 1 further comprising a gateway linking said ToL to an external network, said second network and said ToL being connected to said client telephony devices to provide parallel access from said gateway to said client telephony devices.

7. The system of claim 1 wherein said second network is wireless and supports voice communications with a plurality of mobile units, said client telephony devices including wired telephony units that are specifically supplemented to communicate with said second network so as to provide said second signal-handling capability.

8. A communications system for an enterprise comprising:
a plurality of telephony endpoint devices;
first enterprise telephony resources enabled to support said telephony endpoint devices for communications with a central communications network that is external to said enterprise;
second enterprise telephony resources having a backup mode in which call-processing signaling between said central communications network and said telephony endpoint devices is transmitted via said second enterprise telephony resources, said second enterprise telephony resources being components of an enterprise LAN; and
a detector configured to activate said backup mode when said support of said telephony endpoint devices by said first enterprise telephony resources is disabled.

9. The communications system of claim 8 wherein said telephony endpoint devices include programming and hardware to exchange call-processing signals via either said first or said second enterprise telephony resources.

10. The communications system of claim 9 wherein said telephony endpoint devices are wired telephony devices and said enterprise LAN supports said second telephony endpoint devices that include wireless units, said first enterprise telephony resources being components of a ToL, said backup mode being one in which said second enterprise telephony resources interact with said wired telephony devices only with respect to exchanges of non-voice data.

11. The communications system of claim 10 wherein said second telephony resources include a third mode in which said second telephony resources establish calls to said wired telephony devices in response to a determination that a currently available bandwidth of said enterprise LAN exceeds a threshold bandwidth level.

12. The communications system of claim 10 further comprising a gateway that links said central communications network to said first and second enterprise telephony resources, said second enterprise telephony resources being a wireless network enabled to provide a backup capability for directing said call-processing signaling from said gateway to said wired telephony devices.

13. The communications system of claim 12 wherein said backup capability of said second enterprise telephony resources is limited to exchanging non-voice data.

14. The communications system of claim 8 wherein said detector includes software within each said telephony endpoint device, said software being enabled to determine when said support by said first enterprise telephony resources is disabled.

15. A method of supporting communication with a plurality of telephony endpoint devices comprising:
utilizing a data network as a primary network for exchanging voice data and call-processing signals with said telephony endpoint devices;
detecting occurrences in which said data network is disabled with respect to exchanging said call-processing signals with said telephony endpoint devices; and
activating a secondary signal-handling capability upon detecting said occurrences, said secondary signal-handling capability being available via a second network that is linked to said telephony endpoint devices, said activating including enabling said second network to transmit and receive said call-processing signals to and from said telephony endpoint devices.

16. The method of claim 15 wherein said enabling said second network includes monitoring currently available bandwidth of said second network and includes supporting call sessions involving said telephony endpoint devices when said currently available bandwidth exceeds a predetermined threshold level.

17. The method of claim 15 wherein said activating said secondary signal-handling capability includes providing backup routing between a messaging system and said telephony endpoint devices, such that callers to said telephony endpoint devices are able to record messages using said messaging system.

18. The method of claim 15 wherein said utilizing a data network includes employing a ToL of an enterprise for which said telephony endpoint devices are on-premises units.

19. The method of claim 18 wherein said activating said secondary network includes employing a wireless LAN intended to support call sessions involving mobile wireless units, said telephony endpoint devices being configured for communication with said wireless LAN when said ToL is disabled.

20. The method of claim 19 wherein said communication between said wireless LAN and said telephony endpoint devices is implemented to provide paths for said call-processing signals from said telephony endpoint devices to a gateway of said ToL.

21. The method of claim 15 wherein said detecting occurs using software installed at a plurality of said telephony endpoint devices.

* * * * *